United States Patent [19]

Roesel, Jr.

[11] 4,412,170
[45] Oct. 25, 1983

[54] MOTOR-GENERATOR SYSTEM PROVIDING PROLONGED UNINTERRUPTED POWER SUPPLY TO A LOAD

[75] Inventor: John F. Roesel, Jr., Bradenton, Fla.
[73] Assignee: Precise Power Corporation, Bradenton, Fla.
[21] Appl. No.: 279,880
[22] Filed: Jul. 2, 1981
[51] Int. Cl.³ .................. H02P 9/42; H02K 16/00; H02K 47/04; H02K 21/00
[52] U.S. Cl. .................................. 322/4; 322/9; 322/32; 307/64
[58] Field of Search .................. 322/4, 29, 32, 100, 322/9; 307/64, 68

[56] References Cited

U.S. PATENT DOCUMENTS

| | | | |
|---|---|---|---|
| 3,315,148 | 4/1967 | Grillo | 322/4 |
| 3,521,149 | 7/1970 | Roesel, Jr. | 322/47 |
| 3,609,426 | 9/1971 | Gaul | 322/4 |
| 3,866,442 | 2/1975 | Kouril et al. | 322/4 X |
| 3,931,535 | 1/1976 | Roesel, Jr. | 322/29 X |
| 4,168,459 | 9/1979 | Roesel, Jr. | 322/29 |

Primary Examiner—R. J. Hickey
Attorney, Agent, or Firm—Frederick Shapoe

[57] ABSTRACT

The present invention relates to a generator system connected to an external A.C. power source for supplying electrical A.C. power to a load for prolonged periods when the external electrical A.C. power source fails. The system comprises a main A.C. generator unit capable of generating an A.C. potential at a selected frequency and voltage for the load, and an auxiliary A.C. generator is connected to the main generator for generating A.C. at a high frequency. This high frequency A.C. is conveyed to a relatively small high speed motor and flywheel unit in a sealed chamber, which unit at full speed can store large amounts of rotational kinetic energy. The high speed motor has a stator armature with a power winding and an excitation coil, and a cooperating rotor of soft magnetic material having a cylindrical surface with a layer of magnetizable permanent magnet material thereon. When energized with the high frequency A.C., the power winding causes the rotor to rotate as a hysteresis motor. When the external electrical A.C. power source fails, the excitation coil is energized with high frequency A.C. to magnetize the layer of permanent magnet material into a pattern of north and south magnetic poles which will enable the rotational kinetic energy of the rotor and flywheel to generate high frequency A.C. of constant frequency in the power winding which is supplied to the auxiliary generator to cause it to function as a synchronous motor to drive the main A.C. generator so that it will keep on producing the A.C. potential to the load.

8 Claims, 3 Drawing Figures

MOTOR-GENERATOR SYSTEM PROVIDING PROLONGED UNINTERRUPTED POWER SUPPLY TO A LOAD

RELATED PATENT APPLICATION

This invention is related to and is an improvement upon the invention set forth in the copending U.S. patent application by the present inventor filed concurrently herewith and entitled "Greatly Prolonged Period Non-interruptible Power Supply System", Ser. No. 280,604, filed July 6, 1981.

PRIOR ART

It is known to provide somewhat complex and expensive electrical generator systems employing flywheels to overcome brief faults and irregularities in supply power lines to the motors driving such generators, so that loads sensitive to such power line faults may be supplied electrical potential free of interruptions and irregularities. Usually, however, such systems supply electrical power for only a matter of seconds and, at best, for less than a minute.

A search of the prior art has located the following patents and publications which are believed to be the most pertinent known to applicant respective the present invention.

1. Gaul, U.S. Pat. No. 3,609,426 issued Sept. 28, 1971, entitled "Inertia-driven Standby Electrical Generator Unit", discloses several different modifications in each of which the essential feature comprises a standby generator or alternator with two flywheels, of which the first is fixedly joined to the alternator, while the second flywheel is coupled to an electrically controlled slip clutch. A two speed motor is used to drive the alternator and the first flywheel to a normal speed, and then the motor is run at its higher speed to bring the second flywheel to twice the speed of the first flywheel. When an electrical interruption in the power line to the load occurs, the standby alternator is cut into the line to the load with the kinetic energy of the alternator and the first flywheel supplying the power to generate A.C. potential. The magnetic slip clutch is energized by its electrical controls to let the higher speed second flywheel supply just enough added energy to keep the alternator turning at a constant speed for a short time so that the voltage remains constant. On column 3, lines 30 to 32, the patentee indicates that the second flywheel can keep the alternator functioning properly for some 5 to 10 seconds.

2. Grillo, U.S. Pat. No. 3,315,148 issued Apr. 18, 1967, entitled "A.C. Generator Power Supply", discloses a motor-generator unit that takes power from an electrical utility line to run the motor driving the generator to supply electrical power to a load sensitive to power line faults and interruptions, particularly computers, and thereby isolate the computer from the utility line. In order to handle line faults of up to about one second—see column 1, lines 30 to 36—the motor generator has a flywheel connected to it by a magnetically operated clutch to enable the generator to supply electrical potential to the computer. If the power line fault exceeds a second, as indicated in column 6, lines 39 to 46 and lines 63 to 65, the electrical controls are energized to cycle down the computer. If a fault is corrected in less than a second, the line power is restored and the motor-generator is brought up to speed first and the electromagnetic clutch is then energized to have the flywheel brought up to full speed.

3. Lindahl et al U.S. Pat. No. 2,783,393 issued Feb. 26, 1957 entitled "Apparatus for Emergency Power Transfer", discloses four modifications of apparatus for effecting emergency transfer of power upon failure of a utility power line to a standby unit in order to supply a load that cannot tolerate an interruption. In each modification, there is employed a combined D.C. generator-motor unit with a heavy flywheel and a rotary converter which receives the D.C. from the generator and converts it to A.C. for the load. The flywheel supplies sufficient energy to the D.C. generator to enable it to produce electrical voltage when the utility line is interrupted so that the load can be supplied A.C. power for some seconds until an auxiliary diesel engine can be started and thus drive the D.C. generator. As is well known, the D.C. generator and the rotary converter contain commutators and brushes which require maintenance.

4. Article entitled "Flywheels in Space" on pages 86 and 87 of the August 1980 issue of Popular Science magazine, describes a magnetically suspended brushless motor and a flywheel disposed in an evacuated sealed casing which motor is energized to a high speed and when electrical power is needed the flywheel and motor are electronically operated to generate electrical potential.

In spite of the many components in the apparatus of the three patents above listed, the switches, regulators, magnetic clutches, controls and other electrical members, the brushes and commutators in some devices which require continual care and maintenance, the effective capabilities in response to an interruption in the utility power line are of the order of seconds and at most do not exceed about 20 seconds. By contrast, the present invention provides a relatively simple and comparatively small A.C. induction motor and a flywheel which is coupled to an auxiliary high frequency A.C. generator which is connected to a main A.C. generator supplying A.C. power to a sensitive load. The auxiliary A.C. generator functions as a motor while the A.C. induction motor automatically becomes a high frequency A.C. generator when the utility line supplying power to a motor driving the main A.C. generator is interrupted. The system has a very long life and requires little, if any, maintenance, particularly since it has no brushes or commutators. This novel system will provide electrical power to a load for as much as 20 minutes or more, so that it can ride out all reasonably expected utility power line faults and interruptions except the rare hour or days long interruptions.

In practicing the present invention, the motor in the sealed chamber operates at certain times as a Roesel constant frequency, constant voltage generator as is disclosed in U.S. Pat. Nos. 4,168,459 issued Sept. 18, 1979 and 3,521,149 issued July 21, 1970, and the disclosures of these patents are incorporated herein.

BACKGROUND OF THE INVENTION

For many applications it is desirable and, in fact, necessary to provide A.C. electrical power with a relatively constant voltage and frequency and without any interruptions. Hospitals, electronic data processing installations, radio and television stations, police communication facilities, airport communication and control tower directing facilities, and military installations are examples of electrical users that are critically affected when their A.C. power lines fail or when the voltage and/or frequency drop below or increase above certain relatively narrow limits. Their electrical equipment can misfunction or malfunction when any of these power line faults occur, and serious loss or damage may take place, and in some cases, lives may be jeopardized.

While public utility power systems are regarded as being quite reliable, they do have problems comprising electrical irregularities and failures. Public utility A.C. power lines are subject to numerous brief electrical surges, dips, transients and other faults, while major longer time faults and interruptions occur though less frequently, and prolonged complete power failures arise occasionally. Details of such power system faults are given in the following literature: "Focus on Uninterruptible Power Supplies and Inverters" appearing on pages 100 to 107 of the May 10, 1975 issue of "Electronic Design"; "Power Protection Equipment" on pages 38 to 43 of the July 1977 issue of "Mini-Micro Systems" magazine; and "There's a Time and Place for UPS" on pages 39, 42, 43, 46 and 47 of the August 1979 issue of "Infosystems".

Briefly, in the period of a year, on an average there may be thousands of electrical irregularities such as voltage surges, dips, and transients lasting only a few milliseconds in any given power line. Annually, there may be hundreds of voltage and frequency drops lasting a few cycles and not exceeding about a 25% voltage drop, and up to about 10 complete outages or major line failures where the voltage drops 75% or more, with each outage lasting not more than about 15 minutes or so. Excluding deliberate blackouts or brownouts by the public utility operators in cases of excessive power demands, at rare intervals of perhaps once every year or two on the average, the damaging results of hurricanes, major sleet and wind storms, accidents in or to substations and power plants, fires and so on, can cause utility line interruptions lasting for hours or days.

It would be highly desirable to isolate or insulate loads sensitive to the power line falts, irregularities and brief interruptions lasting up to about 15 minutes, so that a steady input of electrical A.C. power at a selected voltage and frequency can be supplied to these loads regardless of what happens to the utility power line. Desirably, the equipment for so isolating or insulating the load from the power line should be reliable, efficient, of relatively low cost, require small space and need little maintenance, and should be effective to furnish the A.C. power for a period of time of the order of up to 20 minutes when the power line is completely interrupted. This will take care of practically all the normally expected power line problems. For critical facilities where standby generators with an engine are provided, these can be started easily in such time to furnish power for the rare instances of hour or day long power outages. The present invention is provided to meet these parameters.

SUMMARY OF THE INVENTION

A rotatable A.C. generator system is introduced into a circuit being supplied A.C. power from an external A.C. power line which is subject to abnormalities such as dips, transients and other faults as well as less frequent total power outages, whereby to furnish at all times without interruption, A.C. power within a selected frequency and at a desired voltage to a sensitive load. The generator system includes components constructed and arranged to shield the sensitive load from electrical abnormalities in the external power line, while the rotatable generators are operable to supply full A.C. power to the sensitive load for prolonged periods of time when complete power line outages of up to about 15 minutes occur.

The rotatable generator system comprises (1) a main A.C. generator capable of supplying A.C. potential at the selected frequency and desired voltage to the load, and, rotatably connected thereto, (2) an auxiliary A.C. generator capable of generating high frequency A.C. during normal conditions in the external power line, both generators rotatable within a given RPM range under normal power line conditions. Under such normal power line conditions, the auxiliary generator supplies high frequency A.C. potential to a high speed motor and flywheel unit whose speed is at least 6000 RPM, and preferably in the range of from 9,000 to 30,000 RPM. If the main A.C. generator generates 60 Hz or 50 Hz A.C., its speed will ordinarily be within the range of 1200 to 3600 RPM, while the high speed motor and flywheel will be revolving at speeds many times greater. Thus the high speed motor and flywheel will store large amounts of rotational kinetic energy in a relatively small mass and in a small volume.

Upon occurrence of a complete external power line outage or a major voltage drop or other fault, controls will operate to cause the high speed motor to function as a high frequency A.C. generator to produce constant frequency A.C. potential by converting the rotational kinetic energy thereof, and such high frequency A.C. potential is conveyed to the auxiliary A.C. generator which will automatically operate as a synchronous motor driving the main A.C. generator within the given RPM range whereby the main A.C. generator will supply A.C. potential within the selected frequency and at the desired voltage to the sensitive load. The main controls also will disconnect the generator system and the load from the external power line immediately upon the occurrence of the abnormal A.C. condition therein.

The high speed motor and flywheel unit are disposed in a sealed chamber having a low windage-loss atmosphere such as a vacuum or a low density gas such as hydrogen. The high speed motor is of a unique design and construction in order to carry out its functions. The motor comprises a stator comprising a cylindrical core of soft magnetic material with slots containing a power winding which when supplied A.C. will cause the rotor to revolve in the manner of a hysteresis motor. The rotor comprises a field core of soft magnetic material with a layer of magnetizable permanent magnet material on a cylindrical surface thereof which is in spaced juxtaposition to the cylindrical surface in the stator. The stator has slots with an excitation coil surrounding a pole piece so located with respect to the layer of magnetizable permanent magnet material that when the excitation coil is energized with A.C. potential of a specified frequency and the rotor revolves the layer of permanent magnet material is magnetized by a strong pulsating magnetic field in the pole piece into a pattern of north and south magnetic poles. This so-magnetized layer will generate in the power winding of the stator an A.C. potential of the same frequency as the specified frequency of the A.C. energizing the excitation coil.

In one modification of the invention, the main A.C. generator and the auxiliary A.C. generator are driven by an electrical main driving motor supplied power from the external A.C. power line. Interposed between the driving motor and the external power line is a main control unit comprising circuit breakers, fuses, starters and protective means comprising electronic sensors and signal and control means. The main control unit not only provides for the starting and stopping of the driving motor both manually and automatically, but also shields the motor from possibly damaging faults and failures in the external A.C. power line, and additionally signals the controls to the high speed motor to cause it to function as a generator when such abnormal conditions occur in the external A.C. power line. Often minor dips, brief voltage surges and small transients in the external power line are readily absorbed by the driving motor, so that the generators and the sensitive load are completely shielded and insulated from such minor abnormalities. When major faults and interruptions in the external power line result, the main control immediately breaks connection with the circuit to the external A.C. power line, and the entire system is isolated and insulated from such external line difficulties. The main control unit also simultaneously signals another control unit to supply selected high frequency A.C. to the excitation coil in the high speed motor so that it will immediately begin to function as a high frequency generator and will supply A.C. potential to the auxiliary generator to cause it to operate as a synchronous motor driving the main A.C. generator on the given RPM range whereby to keep on supplying A.C. potential at the selected frequency and at the desired voltage to the sensitive load. The large amount of stored kinetic energy in the high speed motor and flywheel unit will supply A.C. potential to the auxiliary generator for many minutes, quite readily up to 15 minutes and more.

When A.C. power is restored in the external power line, the main control unit will signal the control unit for the excitation coil to cease supplying A.C. thereto so that the motor will no longer generate high frequency A.C. Concurrently, the circuit breakers will reconnect the circuit so that the external line A.C. power is again conveyed to the driving motor and it will take up the task of driving the generator system. Accordingly, the sensitive load will be supplied the desired A.C. power uninterruptedly regardless what happens in the external A.C. power line.

In another modification, the external A.C. power line is connected to a similar main control unit, and conductors from the control unit supply the line A.C. potential to both the sensitive load and directly to the main A.C. generator as long as normal conditions prevail in the external A.C. power line. The A.C. power from the external line is first conveyed to an intervening isolating and regulating transformer which in turn supplies the A.C. to the sensitive load so as to shield the load from minor electrical abnormalities in the line. No driving motor is present and the A.C. from the external power line is supplied directly to the main A.C. generator which, in known manner, will operate as a motor so that it and the connected auxiliary generator will accelerate until they reach their full speed which is within the given RPM range. The driven auxiliary generator will generate A.C. potential which is conveyed to the high speed motor and flywheel unit in the sealed chamber and causes the motor to accelerate. Once the high speed motor and flywheel reach their full speed, which is synchronous with the frequency of the A.C. from the auxiliary generator as correlated to the number of poles in the high speed motor stator, no more electrical power will need to be supplied by the auxiliary generator except a small amount to compensate for the frictional and windage losses of the high speed motor unit. Likewise, after the main A.C. generator and the auxiliary A.C. generator reach their full speed, no more line A.C. power will be required except to compensate for friction and windage losses, and the two generators and the high speed motor unit will float on the circuit.

If a major fault, power outage or interruption in the external A.C. power line occurs, the main control unit will immediately disconnect the external power line circuit from the system. The main A.C. generator which has been rotating at full speed but with no load, will at once begin to function as a generator and will begin to supply full A.C. power at the selected frequency and voltage to the sensitive load through the isolating and regulating transformer, so that there is no break in the A.C. power being supplied to the load. At the same time, the main control unit will signal the controls for the excitation coil to supply high frequency A.C. current to the excitation coil so that it will magnetize the layer of permanent magnet material and in less than a revolution of the motor and flywheel high frequency A.C. potential will be generated in the stator power windings of the motor and be conveyed to the auxiliary generator which will automatically function as a synchronous motor driving the main A.C. generator at its given RPM. The rotational kinetic energy of the high speed motor and flywheel will supply electrical A.C. power to keep the main A.C. generator providing full power to the load for a greatly prolonged period of time.

The generators and high speed motor-flywheel unit of this invention will not only insulate and isolate the sensitive load from all minor abnormalities in the external A.C. power line, but will supply full power to the load when complete power interruptions or outages occur in the external line, excluding the relatively rare outages that last for hours or days. This is accomplished by a relatively small compact system. The system provides enough time to enable the sensitive load to be cycled down without loss or damage if the external line outage lasts for more than 15 to 20 minutes. If an auxiliary generator and engine are provided for emergency operation, the present invention will enable the engine to be started and put into operation so as to provide A.C. power from this emergency source to the load and thus even hour or day long utility line outages will have no effect on the operation of the load.

DETAILED DESCRIPTION OF THE INVENTION

Figure 1:
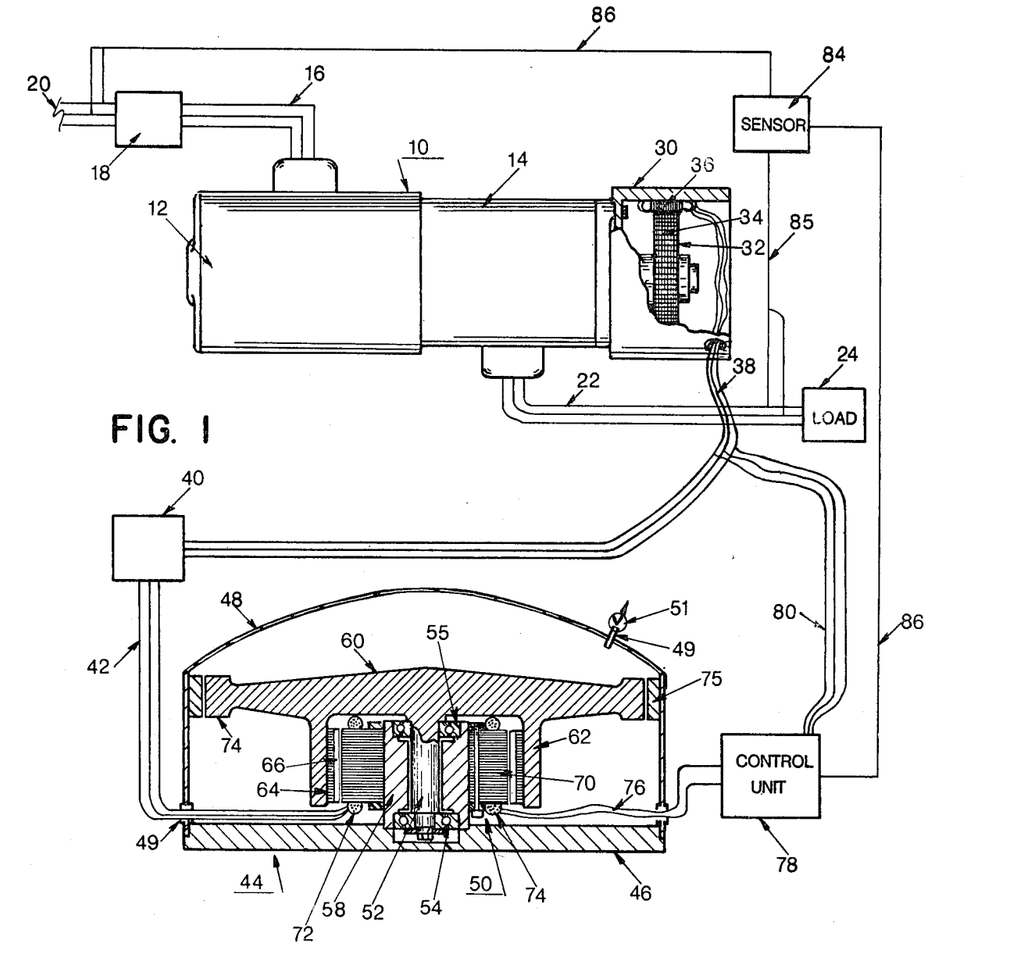
FIG. 1 of the drawing is a schematic view, partly in sections, of the system of this invention.
Figure 2:
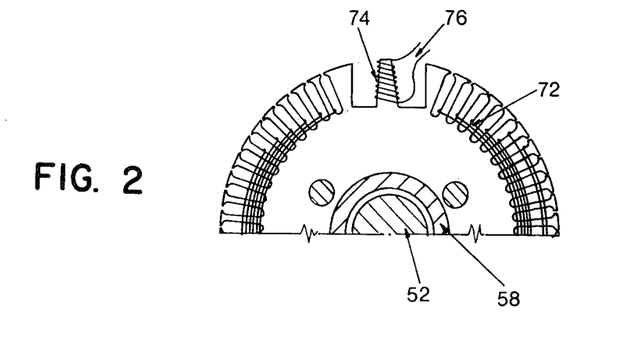
FIG. 2 is an enlarged fragmentary end view of a cross-section of the high speed motor encircled in FIG. 1

Referring to FIGS. 1 and 2 of the drawing, in a first modification of the invention, a motor-generator unit 10 comprises a motor 12 connected to and driving a main A.C. generator 14. An electrical power line 16 conveys A.C. electrical power from a suitable main control unit 18 which has circuit breakers, motor starters, fuses and protective and sensing means for signaling and electronic controls, connectable to an external A.C. power line 20 from a public utility or the like, providing for example, three phase 60 Hz A.C. power. The motor 12 is preferably a synchronous A.C. motor operating at, for example, 1800 RPM, however a rugged A.C. induction motor which will operate with less than 1% slip at full load can be employed. The generator 14 may be a conventional 4 pole machine that produces 60 Hz A.C. at 1800 RPM, at a selected voltage which is conveyed by line 22 to a sensitive load 24.

Connected to the motor 12, desirably by a direct shaft drive, is a high frequency auxiliary generator 30 comprising a rotor 32 of soft magnetic material, having a circular surface carrying a surface layer 34 of permanent magnetic material 34 magnetized into a permanent pattern of north and south magnetic poles. Surrounding the rotor 32 is a stator 36 comprising a core of slotted soft magnetic material with power windings therein to produce at full rotor speed polyphase A.C. of high frequency at least 3 times the frequency of the A.C. in line 12, and preferably from 5 to 20 times the frequency thereof. The high frequency A.C. potential generated by the auxiliary generator 30 is conveyed by a line 38 to an electrical control unit 40 from where it can be supplied by conductor 42 to a sealed chamber 44 comprising a heavy base 46 and a cover 48 within which is provided a low windage-loss atmosphere such as hydrogen or other low density gas, or a vacuum at an absolute pressure of one micron of mercury, for example. A suitable hermetic glass to metal seal 49 enables the conductor 42 to pass through the walls of casing 48 and carry the high frequency A.C. to the stator armature of a motor 50 within chamber 44. The motor 50 comprises a rotatable shaft 52 mounted in a lower bearing 54 disposed in a recess in the base 46 and an upper bearing 55 retained in an upwardly projecting rigid heavy cylinder 58 firmly attached to base 46. At its upper end, the shaft 52 carries a flywheel disk 60 from which a cylindrical field shell 62 projects downwardly. Within the field shell 62 is rigidly fastened a core 64 of soft magnetic material such as stacked laminations of 3% silicon steel having an inner circular cylindrical surface on which is fixed a layer 66 of magnetizable permanent magnet material such as barium ferrite or strontium ferrite, or mixtures thereof, to provide a circular cylindrical aperture. A cylindrical armature core 70 is firmly located on the outside walls of the heavy upwardly projecting cylinder 58. The core 70 is also made of soft magnetic steel such as laminations of 3% silicon-iron with slots for windings therein. The outside of the cylindrical armature core 70 is as of circular cylindrical shape juxtaposed with and complementary to the layer 66 of permanent magnet material, with a small clearance therebetween. Power windings 72 are disposed in selected slots of core 70. In other slots is an excitation coil 74 disposed about a pole piece, so that when a selected A.C. current is passed through the excitation coil 74, a strong magnetic field may be obtained such that when the field shell 62 rotates, a pattern of north and south magnetic poles is induced in the layer 66.

A.C. current to the excitation coil 74 is conveyed by conductors 76 passing through a hermetic seal in the wall 48 from an electronic control unit 78 powered by line 80 tied in to line 38 to receive some of the high frequency A.C. power from the auxiliary generator.

The control unit 78 may be constructed as shown in FIG. 7 of U.S. Pat. No. 4,168,459. The voltage regulator 468A in that patent FIG. 7 is replaced with a full on or full off electronic switch controlled by electrical signals conveyed by line 86 from a sensor 84 which triggers the control 78 when power line 20 fails and a line 86 therefrom to the sensor 84 conveys a signal to this effect to the sensor 84 which then signals controller 78 to send A.C. current to excitation coil 74. Heat generated in stator 70 during its operation is conducted by cylinder 58 to the heavy base 46. Heat developed in the rotor during operation is conducted by shell 62 to flywheel 74 from whose surface it is radiated to the walls of the chamber 44, when the chamber is evacuated. If a hydrogen gas atmosphere is present in the chamber, then the gas will convey heat efficiently from the rotor to the casing 48 and then transferred to the ambient.

The materials and construction of the flywheel 60 should be such as to withstand safely the substantial centrifugal forces developed at extremely high speeds of its rotation. The flywheel may be of forged steel construction with an enlarged hub tapering to support an outer flanged rim portion 61.

For vacuum operation, the bearings 54 and 55 may be lubricated with a solid lubricant such as molybdenum disulphide, tantalum disulphide, or niobium disulphide, or the selenides or tellurides of these metals, or certain low vapor pressure liquid lubricants known in the art.

The chamber 44 may be evacuated through a pipe 49 to a desired low pressure of, for example, one micron of mercury, in order to reduce windage losses when the motor 50 and flywheel 60 are at full speed. The end of the pipe may be provided with a vacuum tight valve 51, or it may be sealed as by solder or a weld. If hydrogen, or other low density gas, is to be used in chamber 44, the chamber is first evacuated to a low pressure and then hydrogen gas is introduced by pipe 49 to a desired pressure. A gas pressure gauge may be provided in the chamber, with any leads or the like passing through the walls by means of a glass to metal hermetic seal. A glass to metal seal 49 may also be provided to enable electrical line to pass through the walls to chamber 44.

The high speed A.C. motor and its associated flywheel can store large amounts of rotational kinetic energy in a relatively small space. Thus a steel flywheel of 24 inches in diameter having an outer rim of a thickness of an inch and of a width of three inches and the flywheel web increasing gradually from about 2 inches at the rim to a hub of four inches in depth, will store a total of about some five kilowatt hours of energy at a speed of 18,000 RPM. In going from 18,000 to 12,000 RPM, the flywheel will release some 55% of this energy. To contain a flywheel of this size and the high speed motor, the chamber 44 may be about 26 inches in diameter and of a height of some 18 inches.

In one sequence for initiating the operation of the apparatus system of the drawing, the circuit breaker and motor starter 18 is operated to close the circuit to power line 16 and the synchronous motor 12 is energized to bring the main and auxiliary A.C. generators 14 and 30 up to normal full speed. The control 40 will be set so that no electrical energy initially goes to the high speed motor 50. After a brief period, the motor 12 will have brought the generators 14 and 30 to full speed and the output of the main generator will be, for example, 60 Hz A.C. which will be conveyed to load 24. The auxiliary generator 30 may be a 40-pole unit and at 1800 RPM will be generating 600 Hz A.C. At this time, the control unit 40 will be caused to allow the 600 Hz A.C. to flow from conductor line 38 through line 42 to motor 50 in the sealed chamber. The flow of A.C. power to the motor 50 may be controlled so as to accelerate the motor slowly in order to avoid overheating. Because of the inertia of the motor and flywheel, it may require a period on the order of from one quarter to one hour before they reach their full speed of, for example, 18,000 RPM. Once full speed, which is synchronous with the high frequency A.C. from generator 30, is reached, the motor 50 will float on the circuit, and since windage and other losses are low, very little energy will need to be supplied by auxiliary generator 30 to the motor 50.

If an interruption in the line 20 occurs so that no electrical power flows to motor 12, the circuit breaker and its associated controls in control unit 18 will operate to break the circuit to the motor. Since the motor 12 is no longer able to supply power to drive the rotors of generators 12 and 30, at for example 1800 RPM, only the rotational kinetic energy of the rotors of the generators will be available to keep on generating A.C. potential output. In doing so, the rotor speed of the generators 14 and 30 will drop in proportion to the amount of energy being converted. The main A.C. generator will continue to operate in the given RPM range for only about a second to generate main A.C. at a frequency and voltage acceptable to the load 20.

If the generator 14 is a 4-pole A.C. generator, at a speed of 1800 RPM it will generate 60 Hz A.C. potential at a specified voltage. At a 10% speed reduction the generator will generate A.C. of 54 Hz and the voltage will also be reduced 10%. Few loads will operate with A.C. having a voltage and frequency reduction of this amount. However, many critical loads such as computers can tolerate only a 0.5% frequency change, therefore quite often frequency is more critical than voltage. In any event, the rotational kinetic energy of the rotating mass of the generators will be effective for only a matter of about a second in generating A.C. potential of an acceptable voltage and frequency for practically all sensitive loads. Even with a very heavy flywheel any practical generator will cease to generate A.C. potentials at a voltage and frequency acceptable to an average sensitive load in about 1 to 10 seconds.

Because of the great amount of stored kinetic energy in the high speed motor 50 and its flywheel 60, the auxiliary generator 30 can function as a driving motor for the main A.C. generator 14, for a prolonged period of time and keep it rotating in its effective RPM range. It is easily possible for a relatively small A.C. induction motor and flywheel rotating at high speed to keep the main A.C. generator 14 rotating in the effective RPM range for from 1 to 20 minutes. By employing two or more of the high speed A.C. induction motor and flywheel units with a single main and auxiliary A.C. generator, proportionately greater time of effective output of A.C. power from the main A.C. generator will be obtained.

It should be understood that when utility power to a factory or office or the like is interrupted, that lighting and other equipment requiring electricity are also interrupted. The circuit 38 that conveys high frequency A.C. to the auxiliary generator 30 during power interruption on the utility line may be used to furnish electricity for fluorescent or other gas discharge lamps so that the operators can see, as well as for other necessary supporting apparatus.

The high speed motor 50 and flywheel 60 are of simple construction and require no maintenance or other special care. They will spin in the evacuated chamber 44 for very long periods of time with no power coming out and very little power is needed to keep up their full rotational speed.

At the present time, in order to provide uninterrupted flow of A.C. power to sensitive electronic data processors for periods of up to about 5 minutes in the event of external power line outages, there have been employed relatively complex electronic systems using solid state components, inverters, switches, transformers and the like that will react rapidly to various faults, surges and failures to suppress line surges and faults, along with stacks of batteries to supply electrical power to the electronic systems in case of complete external line power outages. A large mass of batteries which must be housed in a separate room is required to fully power these data processor loads for even a 5 minute line outage. However, after such 5 minute battery drain, a battery stack will require some 4 to 8 hours to be fully recharged. By comparison, the rotating motor-generator and high speed motor flywheel system of the present invention can be effective to fully power an electronic data processing system for more than 5 minutes upon failure of the external power line, and upon recovery of external power the high speed motor and flywheel can be again brought up to full speed in a period of from about 15 to 30 minutes. Thus the present invention is available to meet a second power line outage in a short time, whereas battery systems will be unavailable for many hours. Other advantages of the present rotating component over battery and electronic systems are present.

EXAMPLE

A motor-generator unit such as in FIG. 1, comprises at 14 a 7½ kilowatt generator generating 60 Hz A.C., the motor 12 is a 20 horsepower synchronous motor operating at 1800 RPM, and the high frequency generator-motor unit 30 produces 600 Hz A.C. and has an output of about 8 kilowatts. The high speed motor 50 in chamber 44 is of a nominal 10 horsepower capacity and can generate about 8 kilowatts of power as a generator supplying 600 Hz A.C. to the unit 30 for periods of time of the order of from 1 to 15 minutes when the power from external power line 20 is subject to an outage. It may take up to an hour for the motor 50 to accelerate from a stand-still condition to 18,000 RPM when 600 Hz A.C. is supplied by generator 30 thereto, with generator 14 concurrently supplying power to load 24.

However, if initially the unit 10 is started cold by energizing the motor 12 until the unit is brought up to 1800 RPM, and no 60 Hz A.C. is being delivered by generator 14 to the load, the full power of the motor is used to power the high frequency generator 30 to supply 600 Hz A.C. to the high speed motor 50, then the motor 50 can be brought up to its full 18,000 RPM in about half an hour. When this occurs, the generator 14 can be activated to supply 60 Hz A.C. to load 24.

If the external power line 20 is subject to an interruption during normal operation of the motor-generator unit 10, the sensor 84 will immediately signal the control unit 78 via line 86 to supply 600 Hz A.C. to the excitation coil 74, and the motor 50 will at once generate 600 Hz A.C. and supply it through lines 42 and 38 to the generator 30 which will cause it to rotate at 1800 RPM, if it has fallen to a speed slightly below this, and to keep on rotating at 1800 RPM. Generator 14 therefore will keep on producing 60 Hz A.C. at the same voltage that it was producing prior to the interruption in line 20, and the load will not be subject to any noticeable change in the A.C. supplied to it by generator 14. Concurrently, upon interruption of power in line 20, the motor control unit will immediately disconnect the circuit to line 16 so that the motor is isolated from power line 20.

Assuming that power in external line 20 is interrupted for a period of 5 minutes, during this period the motor 50 and flywheel 60 will be supplying rotational kinetic energy to provide some 0.62 kilowatt hour output from generator 14 plus any electrical and mechanical losses in units 50, 30 and 14. Such losses will amount to less than 0.30 kilowatt hour. To supply this total of some 0.92 kilowatt hour, the motor 50 and flywheel 60 with a stored total energy of some 4 kilowatt hours at 18,000 RPM, will have dropped in speed from 18,000 RPM to 15,800 RPM.

If, after this 5 minute interruption, the power in line 20 is restored, then the sensor 84 will respond by sending a signal to control unit 78 to cause the motor-generator unit 50 to speed up or slow down the frequency of the 600 Hz A.C. to the excitation coil so that there is a correct phase relation in the power line A.C. to the position of the rotor of the synchronous motor 12 so that no surges will be experienced when the A.C. power in line 20 is re-connected to line 16 to the motor 12. When this proper phase relation occurs, the control unit 18 reconnects line 16 to line 20 to energize the motor 12 and simultaneously control unit 78 is signaled by sensor 84 to cease supplying 600 Hz A.C. to the excitation coil. The unit 50 then ceases to function as a generator and 600 Hz A.C. power flows from the high frequency generator 30 to cause the unit 50 to function again as a hysteresis motor. Motor 50 begins to accelerate steadily from 15,800 RPM and in some 15 minutes will again reach its full speed of 18,000 RPM.

It will be understood that the motor 50 and flywheel 60 are immediately available at any time to meet any further interruptions that may occur in external power line 20, whether or not they have reached the full 18,000 RPM speed. It often happens that several power line outages may take place successively, separated by short periods with A.C. power being available in line 20. Regardless of the vagaries of the A.C. in line 20, the load 24 will be steadily supplied 60 Hz A.C. by generator 14 at the proper voltage so that it is not affected at any time.

For many common applications, the output frequency of the main A.C. generator will be 60 Hz or 50 Hz, the output frequency of the auxiliary generator will be from 5 to 20 times higher in order that the high speed motor be caused to rotate at high speeds so that a small mass can store large amounts of rotational kinetic energy. There is a correlation that has to be made between the frequency of the A.C. potential from the auxiliary generator and the number of poles in the high speed motor in order to secure the desired high rotational velocity of the motor. The following example illustrates such correlation:

EXAMPLE 2

For certain applications, the sensitive load requires that the main generator supply it with 400 Hz A.C. potential. A suitable motor-generator system will comprise a main driving motor having 6 poles and supplied with 60 Hz A.C. from the external A.C. power line, so that it rotates at 1200 RPM and drives a main A.C. generator having 40 poles with a 400 Hz A.C. output. The auxiliary generator may have 60 poles and when driven at 1200 RPM will supply 600 Hz A.C. to the high speed motor-flywheel unit, which will have a full speed of 18,000 RPM.

Figure 3:
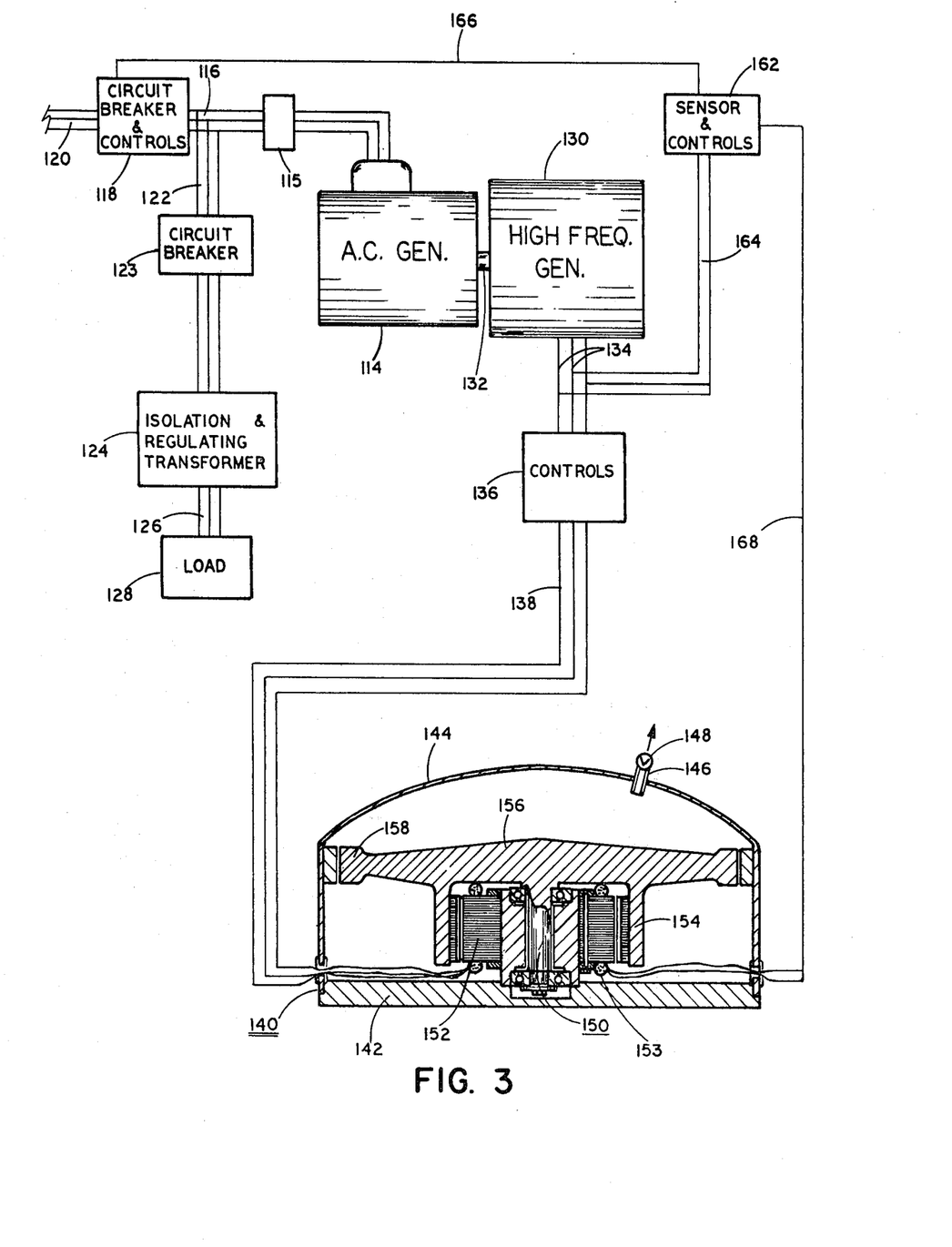
FIG. 3 is a schematic view of a modified form of the invention.

Referring to FIG. 3, there is illustrated a modification of the invention in which there is no separate driving motor for the generators. In this modification the A.C. power from the external A.C. power source is conveyed directly to the sensitive load during normal power line conditions so that no external line A.C. power is employed to keep a driving motor operating nor is the main A.C. generator generating A.C. power to the load continuously. Thus the motor and generator losses at full load, which may be from 10% to as much as 30% of the total A.C. power, are practically eliminated.

The main A.C. generator 114 receives A.C. power through conductors 116 connected to it through an intervening circuit breaker 115, and conductors 116 are connected to a main control unit 118 supplied by A.C. mains 120 connected to an external A.C. power source such as a public utility line which is subject to the previously mentioned occasional faults and failures and outages both minor and major. The main control unit comprises circuit breakers, fuses, relays, electronic sensors and signaling and controlling components necessary to connect and disconnect the power from the system, protect the electrical apparatus in case of lightning surges, line transients and the like, and to signal the several other controls and components for operation when abnormal line conditions occur.

Branching off from conductors 116 are conductors 122 which convey the line A.C. power to an intervening circuit breaker 123 and then to an isolating and regulating transformer 124 which functions to supply A.C. potential free from minor dips, surges, transients and the like by line 126 to the sensitive load 128. Thus during normal power line conditions a quite uniform and stable A.C. potential is supplied to the load 128.

In starting up from a dead or cold condition, normally the breaker 123 is opened so that no power goes to the load 128. The main control unit 118 is operated to close the circuit to let A.C. from line 120 pass to conductors 116, the breaker 115 closed so that the A.C. potential energizes the generator 114 which will automatically function as a motor and begin to accelerate and rotate the auxiliary generator 130 through shaft 132. When the generator 114 has reached its full speed, control 136 may be activated so that the auxiliary generator 130 will produce high frequency A.C. and supply the A.C. through lines 134 and 138 to a motor 150 in the sealed chamber 140. The sealed chamber 140 comprises a heavy base 142 on which the motor 150 is mounted, and a cover 144 which can be evacuated and a gas such as hydrogen admitted through a tube 146 provided with a valve 148. The construction of motor 150 is similar to motor 50 shown in FIGS. 1 and 2, and comprises a stator 152 with a power winding and an excitation coil and a rotor 154 having a layer of magnetizable permanent magnetic material thereon. The rotor of the motor has a small heavy flywheel 156 at its upper end, with a rim portion 158 at its outer periphery.

A sensor and control unit 162 energized with high frequency A.C. potential generated by the auxiliary generator 130 and conveyed by line 164 connected to line 134 controls the flow of high frequency A.C. current through line 168 to the excitation coil in the stator 152 of the motor 150. When a major fault or outage in line 120 occurs, the control unit 118 sends a signal by conductor 166 to the sensor and control unit 162 and this triggers the flow of the selected high frequency A.C. current to the excitation coil.

Assuming no abnormal condition is present in the A.C. mains 120, and that the generators 114 and 130 are at full speed, high frequency A.C. is conveyed by lines 134 and 138 by operation of control 136 to cause the high speed motor 150 to accelerate until it reaches its full speed of, for example, 18,000 RPM. Once full synchronous speed is reached, no power is required to keep generators 114, 130 and motor 150 at their full speed except for frictional and windage losses, since no electrical energy is being taken out, and these components are floating on the circuit. At this time the circuit breaker 123 is closed and A.C. power is conveyed to the isolation and regulating transformer 124 whose A.C. power output is conducted by line 126 to the load 128.

As long as no abnormal electrical condition occurs in the external A.C. power line leading to mains 120, the system functions with very little power being required beyond that to maintain and supply the load 128. However, if a major fault which cannot be smoothed out by the isolating and regulating transformer 124, or if a complete interruption or outage of A.C. potential in mains 120 occurs, then the main control unit 118 trips the breakers therein to disconnect conductors 116 from mains 120, and simultaneously sends a signal by line 166 to the sensor and control unit 162 so that it can immediately cause a selected high frequency A.C. current to flow in line 168 to the excitation coil of stator 152. In a revolution or less of the rotor 154 of motor 150, high frequency A.C. potential flows to the auxiliary generator 130 which automatically becomes a synchronous motor and drives the main A.C. generator 114 at a speed within the given RPM range and A.C. potential at the selected frequency and voltage is delivered by lines 116 and 122 to the transformer 124 and from it to the load 128. There will be no appreciable change in the flow of A.C. potential to the load 128 due to the presence of an abnormal external power line condition. The rotational kinetic energy of the high speed motor-flywheel unit will provide for full powering of the generators 114 and 130 for a greatly prolonged period of time—easily up to 15 minutes or more.

When normal A.C. power conditions are restored in mains 120, the main control unit 118 will sense this and will concurrently transmit a signal by line 166 commanding the sensor and control unit 162 to cease sending A.C. current to the excitation coil in motor 150 so that the motor unit is no longer generating high frequency A.C., and the circuit breakers in unit 118 are closed so as to again convey external line A.C. power to the load 128. The main A.C. generator will receive A.C. power from conductors 116 and will function as a motor to drive the auxiliary generator 130 to generate high frequency A.C. to be supplied to the motor 150 which will have lost some of its speed during the preceding abnormal line condition and the high speed motor will be accelerated over a period until it will have regained its full synchronous speed.

While ball or roller type bearings have been shown in the drawings for the support of the high speed motor and its associated flywheel, it will be understood that permanent magnetic suspension bearings can be employed as a substitute since the motor and flywheel are of such a relatively small mass. Problems of lubrication and deterioration of the balls or rollers with the possibility of catastrophic failure can be completely eliminated thereby.

I claim:

1. In a generator system connected to and cooperating with an external A.C. power source which is subject to faults, failures and outages, in order to supply A.C. power of a substantially constant frequency and voltage to a load without interruptions and including prolonged periods when electrical power from the external A.C. source fails, in combination:

(a) a rotatable generator system connectable to the external A.C. power source, comprising (1) a main A.C. generator which can generate and supply to the load a main A.C. potential at a selected substantially constant frequency and voltage while the main A.C. generator is rotating in a given RPM range and (2) an auxiliary high frequency A.C. generator rotatably connected to the main A.C. generator, the auxiliary A.C. generator capable of functioning as a synchronous motor when supplied high frequency A.C. potential from an outside source, and (b) the auxiliary generator being electrically connected to a high speed motor and flywheel unit in a sealed chamber to supply the high frequency A.C. to the high speed motor to cause it to rotate at a high speed whereby the motor and flywheel unit can store large amounts of rotational kinetic energy at full speed, a low windage-loss atmosphere being present in the sealed chamber, the high speed motor comprising a motor having a field core of soft magnetic material with a circular cylindrical surface having a layer of magnetizable permanent magnet material thereon, and a slotted stator armature of soft magnetic material having a cylindrical surface complementary to and juxtaposed with the layer of magnet material on the field core, an excitation coil in slots in the armature whereby when A.C. current of a selected frequency is passed through the excitation coil it will induce in the juxtaposed layer of permanent magnet material in the rotating field core a pattern of north and south magnetic poles, and power windings in other slots in the stator armature, the power windings being connected to the auxiliary A.C. generator to receive the high frequency A.C. potential therefrom to cause the high speed motor to operate as hysteresis motor, and upon failure of the external electrical A.C. power, the excitation coil can be energized with a selected constant frequency A.C. current to induce the pattern of north and south magnetic poles in the layer of magnetizable permanent magnet material and thereby cause the power windings in the armature to generate high frequency A.C. of a constant frequency as the rotational kinetic energy of the rotor and flywheel cause the rotor and the stator to rotate with respect to each other, and when this last high frequency A.C. is supplied to the auxiliary generator it will be caused to operate as a synchronous motor to drive the main A.C. generator for a prolonged period of time in the given RPM range and thus generate A.C. potential of the selected frequency and voltage to be supplied to the load.

2. In the generator system of claim 1 wherein an A.c. driving motor supplied electrical power from the external A.C. electrical power source drives the main generator in a given RPM range which generates and supplies to the load a main A.C. potential at a selected frequency and voltage, and the A.C. motor also driving the auxiliary A.C. generator which generates A.C. potential at a high frequency, the auxiliary generator capable of functioning as a synchronous motor when supplied A.C. potential from an outside source, and means for conveying the high frequency A.C. to the high speed motor.

3. The generator system of claim 2, wherein control means are provided for connecting the A.C. driving motor to the external electrical power source to enable the generator system to be brought up to its given RPM range so that it will generate the main A.C. potential and the auxiliary A.C. generator to generate the high frequency A.C., and means to supply the high frequency A.C. to the high speed motor to bring it up to its full speed; and, upon failure of the external electrical source, the control means will disconnect the driving motor from the failed external electrical power source, and concurrently enables the energizing of the excitation coil with the selected A.C. current to induce the pattern of north and south magnetic poles in the layer in the field core whereby the power windings in the armature will generate high frequency A.C. of a constant frequency during the relative rotation of the stator armature with respect to the rotor, and supplying the high frequency A.C. so generated to the auxiliary generator which thereupon functions as a synchronous motor to drive the main generator in the given RPM range so as to keep on supplying to the load the main A.C. potential of the selected frequency and voltage, the rotational kinetic energy of the high speed motor and flywheel unit being sufficient to keep the main generator operating in the given RPM range for a prolonged period of time, and upon return of the external A.C. power source, the control means will simultaneously reconnect the driving motor to the external A.C. power source and stop energizing of the excitation coil with high frequency A.C.

4. The generator system of claim 2, wherein the driving motor is a synchronous motor.

5. The generator system of claim 1, wherein the low windage-loss atmosphere in the sealed chamber is hydrogen gas.

6. The generator system of claim 1, wherein the low windage-loss atmosphere in the sealed chamber is a vacuum.

7. The generator system of claim 1, wherein the external A.C. power source is connected in a circuit through a main control means to supply A.C. power to both the load and to the main generator, the external A.C. power causing the main generator to function as a motor whereby to drive the auxiliary generator to cause it to generate high frequency A.C. potential which is supplied to the high speed motor and flywheel unit to bring it up to full speed, and upon fault or failure of the external A.C. power source, the main control disconnects the circuit to the external A.C. power source and the control means causes selected high frequency A.C. to be supplied to the excitation coil so that high frequency A.C. is generated by the high speed motor and flywheel unit and supplied to the auxiliary generator to cause it to function as a motor to drive the main A.C. generator in the given RPM range to generate and supply main A.C. potential to the load without any interruption.

8. the generator system of claim 7 wherein an isolating and regulating transformer is interposed in the circuit from the main control means to the load.

* * * * *